United States Patent [19]

Ueda

[11] Patent Number: 5,078,503
[45] Date of Patent: Jan. 7, 1992

[54] MECHANISM OF EYEPIECE FOR ENDOSCOPE

[75] Inventor: Hirohisa Ueda, Tokyo, Japan

[73] Assignee: Asahi Kogaku Kogyo Kabushiki Kaisha, Tokyo, Japan

[21] Appl. No.: 320,053

[22] Filed: Mar. 7, 1989

[30] Foreign Application Priority Data

Mar. 11, 1988 [JP] Japan .................. 63-58700

[51] Int. Cl.$^5$ .................. G02B 7/02; G02B 15/00
[52] U.S. Cl. .................. 359/823; 359/703
[58] Field of Search .................. 350/96.27, 245–257, 350/320, 321, 96.26, 518–556, 410, 427, 428, 429, 584–588; 351/205, 206, 216, 231, 236, 173, 176, 217; 128/4, 6; 354/219

[56] References Cited

U.S. PATENT DOCUMENTS

| | | | |
|---|---|---|---|
| 4,351,587 | 9/1982 | Matsuo et al. | 350/255 |
| 4,367,730 | 1/1983 | Tanaka | 128/6 |
| 4,404,964 | 9/1983 | Kanbara | 128/4 |
| 4,412,728 | 11/1983 | Sakane et al. | 351/206 |
| 4,580,559 | 4/1986 | L'Esperance | 351/217 |
| 4,848,895 | 7/1989 | Kato et al. | 351/211 |

FOREIGN PATENT DOCUMENTS

| | | |
|---|---|---|
| 0027651 | 4/1981 | European Pat. Off. |
| 45-27677 | 9/1970 | Japan . |
| 60-15618 | 1/1985 | Japan . |
| 61-33165 | 7/1986 | Japan . |
| 62-16917 | 1/1987 | Japan . |
| 62-9884 | 3/1987 | Japan . |

OTHER PUBLICATIONS

English translation abstract for Japanese patent document 60-15618.

*Primary Examiner*—Bruce Y. Arnold
*Assistant Examiner*—Thong Nguyen
*Attorney, Agent, or Firm*—Sandler, Greenblum, & Bernstein

[57] ABSTRACT

A mechanism of an eyepiece for an endoscope which is designed so that an ocular lens is movable along the optical axis for the purpose of dioptric adjustment and, when an attachment of a photographic recording device or an imaging device is attached to the eyepiece, the ocular lens is automatically moved to a predetermined projection position within the range of dioptric adjustment, no matter where the ocular lens is disposed in the dioptric adjustment range at that time. The mechanism comprises an ocular lens disposed so as to face an emergent end face of an image guide, a diopter adjusting device for adjusting the level of diopter by causing the ocular lens to move back and forth along the optical axis, a moving device for moving the ocular lens for projection, the moving device being activated in response to attaching of an attachment to the eyepiece so as to move the ocular lens to a predetermined projection position halfway in the range of dioptric adjustment from either one of the two positions, that is, a position which is forward of the projection position and a position which is rearward of it, and a pre-moving device for previously moving the ocular lens when disposed at the other of the two positions to the first position in response to attaching of the attachment to the eyepiece.

16 Claims, 5 Drawing Sheets

MECHANISM OF EYEPIECE FOR ENDOSCOPE

BACKGROUND OF THE INVENTION

1. Field of the Invention

The present invention relates to a mechanism of an eyepiece for an endoscope. More particularly, the present invention pertains to a mechanism of an eyepiece for an endoscope which is designed so that an ocular lens is movable along the optical axis for the purpose of dioptric adjustment and, when an attachment of a photographic recording device or an imaging device is attached to the eyepiece, the ocular lens is automatically moved to a predetermined projection position within the range of dioptric adjustment, no matter where the ocular lens is disposed in the dioptric adjustment range at that time.

2. Description of the Related Art

The eyepiece of an endoscope that is in general use is designed so that an ocular lens is not only employed for observation by the naked eye but also used as a projection lens for photographic recording or other imaging purposes. More specifically, the ocular lens is adapted to be movable along the optical axis within the range of from a minus diopter position to a plus diopter position so that, when the ocular lens is employed for observation by the naked eye, the level of diopter is adjustable to the user's eye.

There has heretofore been one type of eyepiece structure for endoscopes in which the ocular lens, when used as a projection lens, projects the real image. From the viewpoint of the degree of freedom with which the system is handled and also the realization of a waterproof structure, however, it is more advantageous to set the ocular lens at the zero diopter position so as to project the image at infinity. For this reason, it has been common practice to move the ocular lens to the zero diopter position, halfway in the dioptric adjustment range, when it is used as a projection lens for photographic recording or other imaging purposes.

In eyepiece mechanisms for endoscopes proposed in the early stage of development of the art, the position of the ocular lens is adjusted by turning a dioptric adjustment ring by a manual operation every time the ocular lens needs to be moved to the zero diopter position. With this arrangement, however, the operation is complicated and troublesome and, every time the system is to be used for observation by the naked eye after the use for photographic recording or other imaging purposes, dioptric adjustment must be made over again. Accordingly, more advanced eyepiece mechanisms are provided with a lens moving means that is adapted to move the ocular lens to the zero diopter position in response the attaching of a photographic recording device or an imaging device to the eyepiece, thereby enabling the ocular lens to be automatically moved between the projection position and an appropriate diopter position in linkage with attaching and removal of the attachment.

In this prior art, setting of the ocular lens to the projection position is effected by pressing it against a cam surface by means of the biasing force of a spring which is applied to the lens in the direction of the optical axis. Therefore, two cams are provided one cam is adapted to push the ocular lens back to the projection position when it is at a forward position (i.e., a plus diopter position) of the projection position (i.e., the zero diopter a second cam is adapted to push the ocular lens back to the projection position when it is at a rearward position (i.e., a minus diopter position) of the projection position.

Setting of the ocular lens to the projection position must be effected with a considerably high degree of accuracy. This is because even a very small error in the lens position, for example, on the order of 0.02 mm, has a critical effect on the projection of the image and makes it impossible to obtain an in-focus picture.

In this regard, the above-described prior art suffers from several problems. The prior art has two cam surfaces for setting the ocular lens to the projection position and these two cam surfaces are alternatively employed according to whether the ocular lens is at a plus diopter position or a minus diopter position as a result of the preceding dioptric adjustment. It is extremely difficult to form two cam surfaces at exactly the same position due to the limited degree of accuracy in machining. Accordingly, if focusing is effected on the basis of one cam surface, there may be an error in the focus when the other cam surface is used to set the ocular lens to the projection position. In such a case, it is impossible to obtain a clear picture.

SUMMARY OF THE INVENTION

An object of the present invention is to provide a mechanism of an eyepiece for an endoscope which is designed so that, when an attachment of a photograhic recording device or an imaging device is attached to the eyepiece, the ocular lens is accurately moved to a predetermined projection position halfway in the dioptric adjustment range, thereby enabling a clear in-focus picture to be obtained at all times.

Other objects and advantages of the present invention will become apparent from the following detailed description of an illustrated embodiment of the invention.

According to the present invention, there is provided a mechanism of an eyepiece for an endoscope comprising: an ocular lens that is disposed so as to face an emergent end face of an image guide; a diopter adjusting device for adjusting the level of the diopter by causing the ocular lens to move back and forth along the optical axis; a moving device for moving the ocular lens for projection, the moving device being activated in response to the attaching of an attachment to the eyepiece so as to move the ocular lens to a predetermined projection position halfway in the range of dioptric adjustment from either one of the two positions, that is, a first position (minus diopter) position which is forward of the projection position and another position (plus diopter) which is rearward of it; and a pre-moving device for moving the ocular lens when disposed at the other of the two positions to the first position in response to the attaching of the attachment to the eyepiece.

BRIEF DESCRIPTION OF THE DRAWINGS

The present invention may be more fully understood from the description of a preferred embodiment of the invention set forth below, together with the accompanying drawings, in which.

DESCRIPTION OF THE EMBODIMENT

Figure 1:
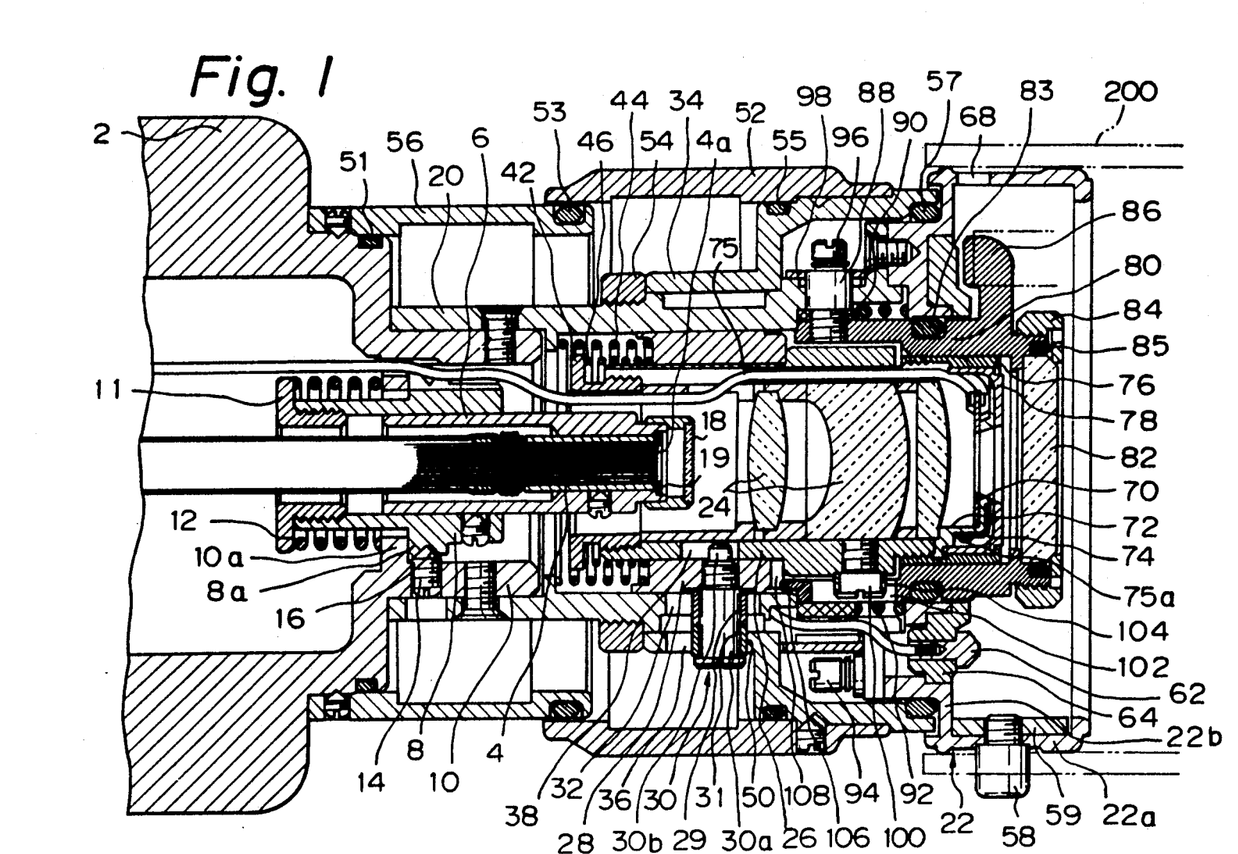
FIG. 1 is a sectional view of one embodiment of the present invention.
Figure 2:
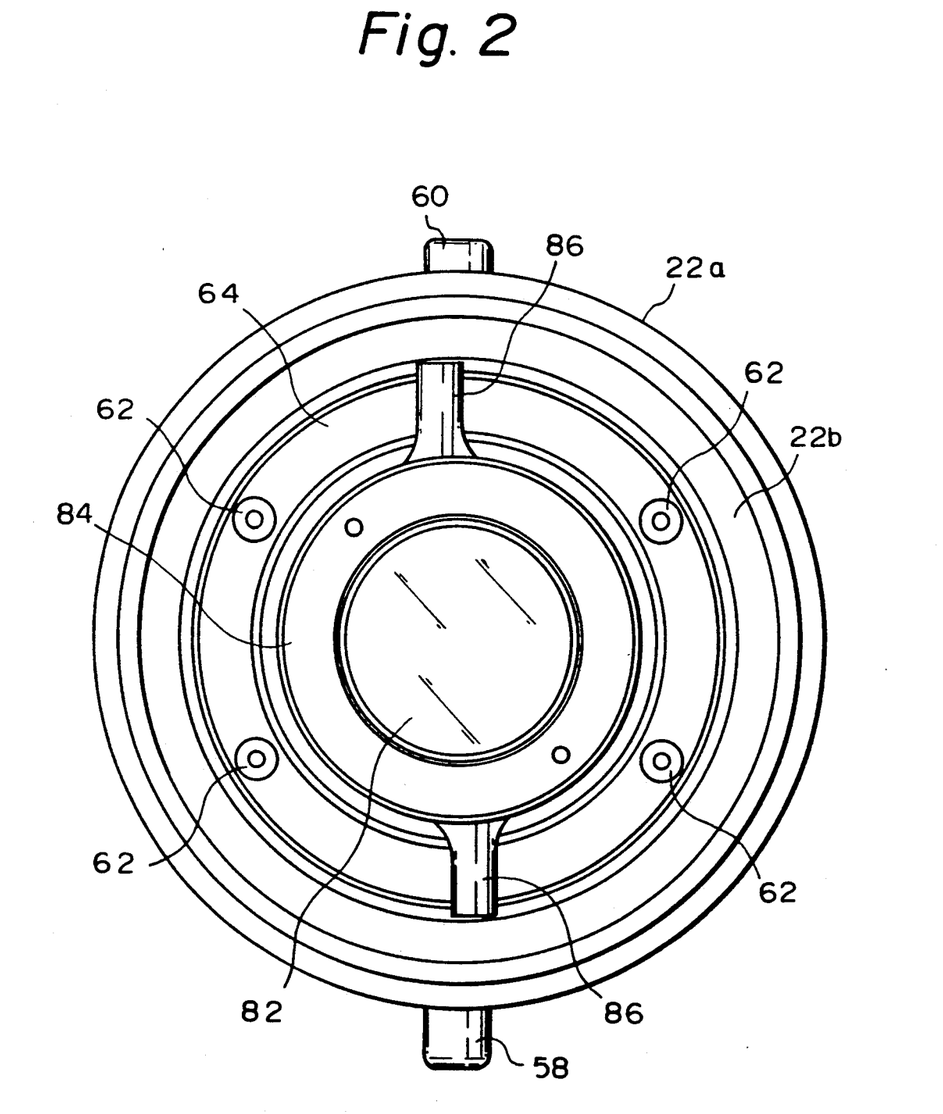
FIG. 2 is a side view of the embodiment.

FIG. 1 is a sectional view of one embodiment of the present invention, while FIG. 2 is a side view of the embodiment. In FIG. 1, structures which are present in various sections are shown in a single sectional view for the convenience of illustration of the internal structure of the embodiment.

FIG. 1 shows a control part 2 of an endoscope, a bundle of image guide fibers 4 secured to the control part 2, and an emergent end face 4a of the image guide fiber bundle 4.

The image guide fiber bundle 4 is secured to a retaining cylinder 6 by means of screws. The retaining cylinder 6 slidably fits in an eccentricity adjusting cylinder 8. The eccentricity adjusting cylinder 8 has a flange 8a which abuts against a flange 10a of a base cylinder 10 which is formed on the control part 2. A spring retainer 11 is threaded into an end portion of the eccentricity adjusting cylinder 8. A compression coil spring 12 is loaded between the spring retainer 11 and the flange 10a of the base cylinder 10, thus causing the two flanges 8a and 10a to abut against each other at all times. Between the outer periphery of the flange 8a of the eccentricity adjusting cylinder 8 and the inner periphery of the base cylinder 10 is provided a clearance which allows the eccentricity adjusting cylinder 8 to move radially by a very small amount. The outer periphery of the flange 8a is provided with a V-shaped annular groove 16, which is fitted with three eccentricity adjusting screws 14 that are circumferentially provided at equal spacings of 120°.

By virtue of the above-described arrangement, it is possible to adjust the eccentricity of the image guide fiber bundle 4 with respect to the optical axis by properly adjusting the three screws 14. A protective glass 18 prevents adhesion of dust to the emergent end face 4a of the image guide fiber bundle 4. The reference numeral 19 denotes a visual field mask.

A support cylinder 20 is secured to the base cylinder 10 by means of screws, the support cylinder 20 serving as a frame of the eyepiece. An attachment retaining ring 22, to which an attachment of a photographic recording device or an imaging device is to be attached, is secured to the outer end portion of the support cylinder 20 by means of screws.

An ocular lens cylinder 26 is disposed within the support cylinder 20 so as to be movable back and forth along the optical axis, the ocular lens cylinder 26 retaining an ocular lens group 24 facing the emergent end face 4a of the image guide fiber bundle 4. An intermediate cylinder 28 is interposed between the front-half part (the left-hand side as viewed in FIG. 1) of the ocular lens cylinder 26 and the support cylinder 20 such that the intermediate cylinder 28 is movable back and forth along the optical axis between the two cylinders 20 and 26.

The intermediate cylinder 28 has an interlocking pin 30 threaded thereinto. The interlocking pin 30 has an interlocking portion 30a projects radially outward and a regulating portion 30b projects radially inward. The interlocking portion 30a has two roller rings 29 and 31 that are rotatably fitted on the outer periphery thereof. The interlocking portion 30a extends through a straightforward guide groove 32 formed in the support cylinder 20 and further through a cam opening 36 formed in the peripheral portion of a cam cylinder 34. On the other hand, the regulating portion 30b is fitted in a straightforward guide groove 38 formed in the ocular lens cylinder 26 such that the guide groove 38 extends straight in the direction of the optical axis so as to prevent rotation of the ocular lens cylinder 26 and, at the same time, allow the ocular lens cylinder 26 and the intermediate cylinder 28 to slidably move relative to each other along the optical axis within the range determined by the length of the straightforward guide groove 38.

The intermediate cylinder 28 is outwardly biased (rightward as viewed in FIG. 1) by the action of a first compression coil spring 44. The ocular lens cylinder 26 is biased so as to move inward (leftward as viewed in FIG. 1.), relative to the intermediate cylinder 28 by the action of a second compression coil spring 46, which is weaker than the first compression coil spring 44. Thus, the ocular lens cylinder 26 and the intermediate cylinder 28 are biased so as to abut against each other. The reference numeral 42 denotes a spring retainer which is threaded into the inner end portion of the ocular lens cylinder 26 and against which the second compression coil spring 46 abuts. The ocular lens cylinder 26 and the intermediate cylinder 28 always move together as one unit unless both of them are restrained from moving. When the intermediate cylinder 28 is fixed, however, the ocular lens cylinder 26 can be moved alone outward against the force from the second compression coil spring 46.

Figure 3:
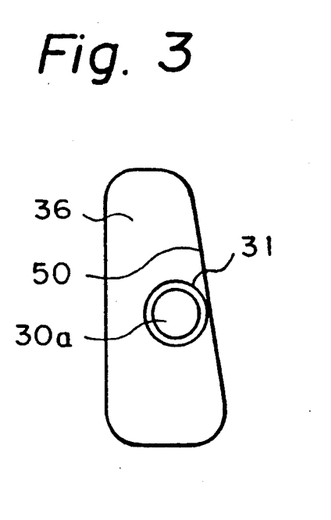
FIG. 3 schematically shows a cam opening for dioptric adjustment employed in the embodiment.

The cam opening 36 that is provided in the cam cylinder 34 is formed such that the front wall surface (the right-hand wall surface as viewed in FIG. 1) of the cam opening 36 is defined as a cam surface 50, as shown in FIG. 3. The interlocking portion 30a of the interlocking pin 30 is usually maintained in contact with the cam surface 50 through the roller ring 31 by means of the biasing force from the first compression spring 44. Accordingly, as the cam cylinder 34 is rotated, the interlocking portion 30a moves along the slope of the cam surface 50, thus causing the ocular lens cylinder 26 to move along the optical axis through the intermediate cylinder 28.

The cam cylinder 34 is secured through screws to a diopter adjusting ring 52, which is fitted on the outer periphery thereof. Accordingly, as the diopter adjusting ring 52 is rotated, the ocular lens cylinder 26 is moved along the optical axis to effect dioptric adjustment. A nut 54 is screwed on the support cylinder 20 so as to prevent the cam cylinder 34 from moving in the axial direction. A cover cylinder 56 covers the area between the base cylinder 10 and the diopter adjusting ring 52. Reference numerals 51, 53, 55 and 57 denote O-rings for sealing.

The attachment retaining ring 22 has a cylindrical portion 22a and a bottom portion 22b. The cylindrical portion 22a has guide pins 58 and 60 for guiding an attachment 200 which are provided on the outer periphery thereof in point symmetry with each other about the center of the cylindrical portion 22a, as shown in FIG. 2. In FIG. 1, the other guide pin 60 is not shown due to reasons of illustration. A plate-shaped nut 59 secures each of the guide pins 58 and 60.

The bottom portion 22b of the attachment retaining ring 22 is provided with a plurality of electric contacts 62 for providing electrical contact with the attachment 200. The electric contacts 62 are provided to apply various kinds of electric signals, for example, one which represents the level of brightness of the object image, to a photographic recording device or an imaging device. The electric contacts 62 project from an insulating ring 64 which is secured to the bottom portion 22b of the attachment retaining ring 22. The cylindrical portion 22a is provided with a plurality of drainage holes 68 so that any fluids such as water are quickly removed from the inside of the attachment retaining ring 22.

Figure 4:
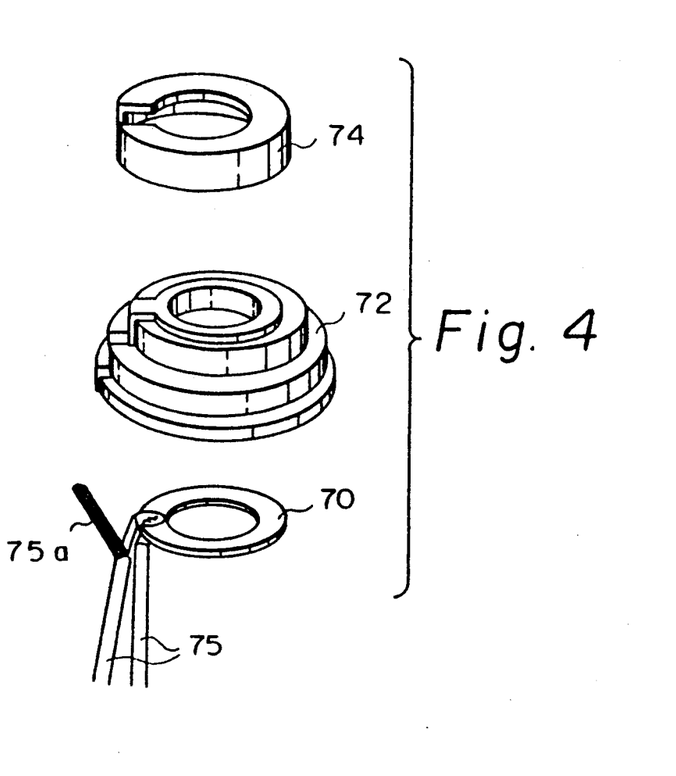
FIG. 4 is an exploded perspective view of a light-receiving element and other elements associated therewith in the embodiment.

A ring-shaped light-receiving element 70 is disposed in front of the emergent end of the ocular lens group 24 to detect a quantity of marginal ray of light that passes through the ocular lens group 24. As shown in FIG. 4 which is an exploded perspective view, the light-receiving element 70 is bonded to an electrical insulating holder 72. A metallic shielding ring 74 is disposed around the light-receiving element 70 to shield it from external noise. Reference numeral 75 denotes shielded wires for transmitting signals, each wire 75 having a braided shielding wire 75a connected to the shielding ring 74. These elements are firmly clamped by means of a retaining ring 76 screwed onto the end portion of the ocular lens cylinder 26 with an electrical insulating cover 78 sandwiched therebetween.

An actuating cylinder 80 is disposed on the outer periphery of the ocular lens cylinder 26 so as to be rotatable around the optical axis. A cover glass 82 is secured to the front side of the actuating cylinder 80 by means of a nut 84. Reference numerals 83 and 85 denote O-rings for sealing. A pair of actuating projections 86 are formed on the actuating cylinder 80 so as to project sideward from respective positions which are in point symmetry with each other about the center of the actuating cylinder 80. The arrangement is such that the actuating cylinder 80 is rotated around the optical axis through actuating projections 86 in response to attaching of the attachment 200 to the attachment retaining ring 22.

The actuating cylinder 80 has a pin 88 projecting sideward from the inner end portion (the left end portion) thereof. A ring-shaped plate 90 is coupled to the actuating cylinder 80 in one unit by means of the pin 88. A third compression coil spring 92 is retained by the ring-shaped plate 90 so that the actuating cylinder 80 is biased forward (leftward as viewed in FIG. 1). The third compression coil spring 92 has a larger spring constant than those of the first and second compression coil springs 44 and 46. A tension coil spring 96 is retained at two ends thereof by a pin 94 which is fixed to the support cylinder 20 and the pin 88 provided on the actuating cylinder 80, such that the spring 96 extends along the inner surface of the cam cylinder 34 in a semicircular form, thereby constantly biasing the actuating cylinder 80 so as to return to a reference position. In FIG. 1, only the retained end portion of the tension coil spring 96 is illustrated. The reference numeral 98 denotes a guide ring which is provided to prevent the tension coil spring 96 from interfering with other members.

The ocular lens cylinder 26 is provided with an actuating pin 100 that projects sideward therefrom. Accordingly, the actuating pin 100 is movable only in the direction of the optical axis together with the ocular lens group 24. The head of the actuating pin 100 extends into a cam bore 102 provided in the side wall of the actuating cylinder 80. A roller ring 104 which is rotatably fitted on the outer periphery of the actuating pin 100.

Figure 5:
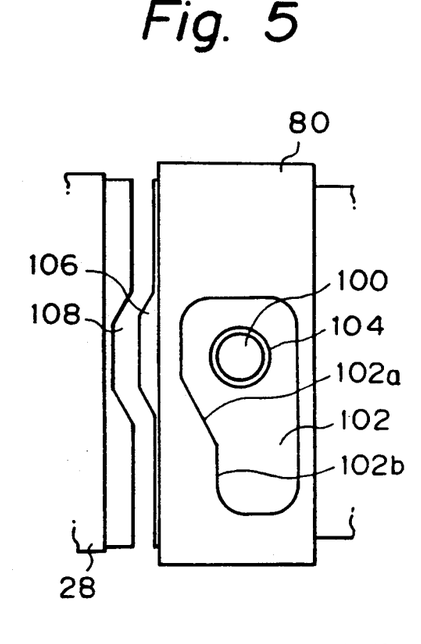
FIGS. 5 to 9 are schematic views of a pre-moving means employed in the embodiment, showing the pre moving device in various operative states.

The cam bore 102 has, as shown in FIG. 5, a cam surface including a slant surface 102a which is adapted to cause the ocular lens cylinder 26 to move forward and a flat surface 102b which has been set at the zero diopter position. In this embodiment, the zero diopter position is set so as to be the projection position that is used when the attachment 200 is attached to the attachment retaining ring 22. Accordingly, the image is formed at infinity and, therefore, the degree of freedom with which the system is handled is high.

Figure 6:
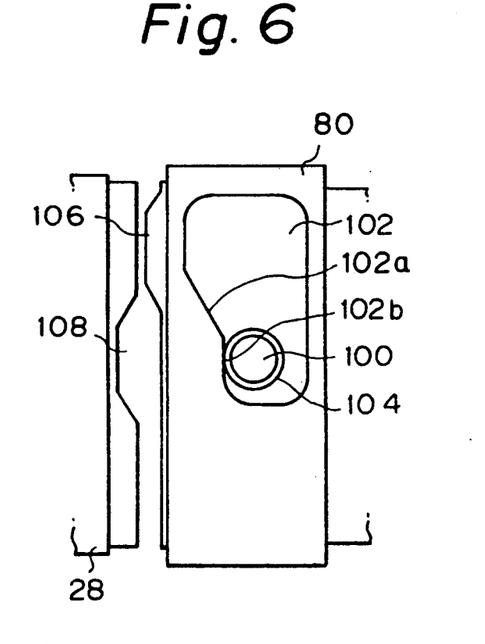

If the attachment 200 is attached to the attachment retaining ring 22 and the actuating projections 86 are thereby caused to revolve when the ocular lens cylinder 26 is at a forward position (leftward or first position) of the zero diopter position (that is, when the cylinder 26 is at a minus diopter position), the flat surface 102b of the actuating cam 102 forces the actuating pin 100 to move rearward (rightward), as shown in FIG. 6, thus causing the ocular lens group 24 to move to the zero diopter position defined as the projection position. Thus, the cam bore 102 acts so as to move the ocular lens group 24 to the zero diopter position when the attachment 200 is attached to the eyepiece when the ocular lens group 24 is at a minus diopter position. When the ocular lens group 24 is at a plus diopter position (i.e., rightward, rearward, or second position), the cam bore 102 does not take part in movement of the ocular lens group 24, as described later. If the attachment 200 is removed from the attachment retaining ring 22, all the states are returned to those before attaching of the attachment 200.

Thus, the cam bore 102 formed in the actuating cylinder 80, the actuating pin 100 provided on the ocular lens cylinder 26 and other associated elements comprise in combination a moving means for moving the ocular lens group 24 disposed at a minus diopter position to the zero diopter position defined as the projection position.

The actuating cylinder 80 has a trapezoidal projection 106 that projects rearward from the rear end face thereof. The end face of the intermediate cylinder 28, which faces the rear end face of the actuating cylinder 80, is provided with a trapezoidal recess 108 which is sufficiently large to receive the projection 106 without interference. When the eyepiece has no attachment attached thereto, the projection 106 and the recess 108 face each other, as shown in FIG. 5. The intermediate cylinder 28 moves back and forth along the optical axis in response to an operation for dioptric adjustment, but when the ocular lens group 24 is at a minus diopter position, the intermediate cylinder 28 is not in contact with the projection 106, as shown in FIGS. 5 and 6. In other words, when the ocular lens group 24 is at a minus diopter position, the projection 106 performs no action. Accordingly, there is no fear of erroneous operation.

Figure 7:
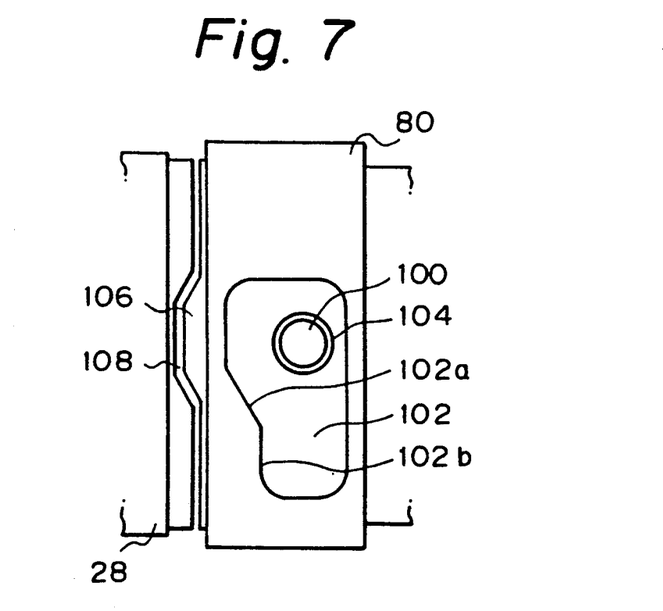
Figure 8:
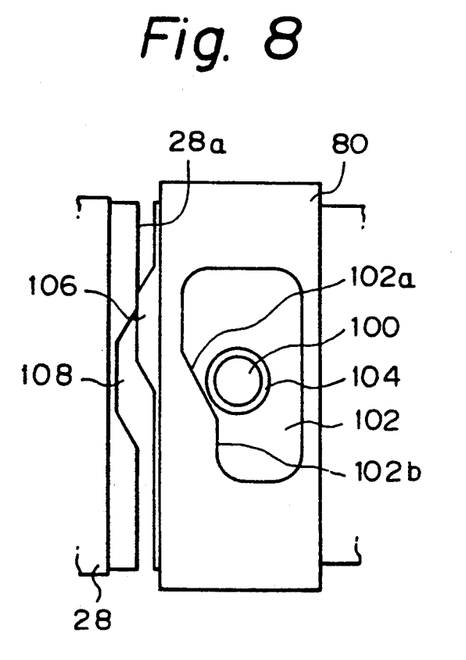
Figure 9:
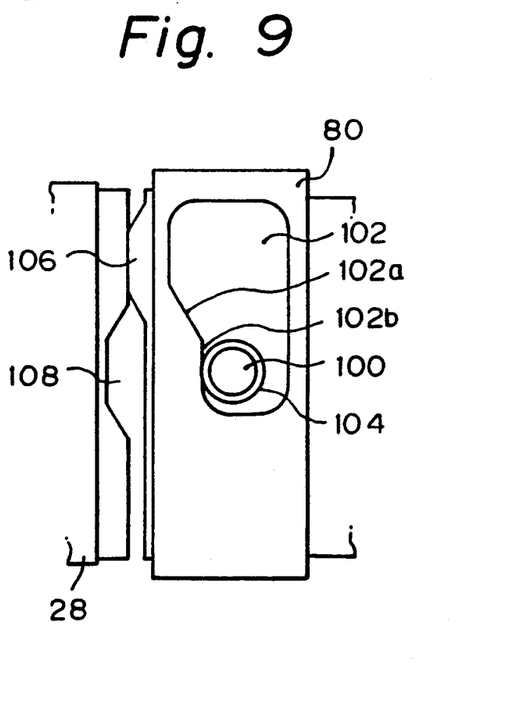

When the level of diopter is adjusted to zero or a plus diopter, the intermediate cylinder 28, together with the ocular lens group 24, moves rearward (rightward) to a (second) position where the projection 106 is received within the recess 108, as shown in FIG. 7. Accordingly, if, in this state, the attachment 200 is attached to the attachment retaining ring 22 and the actuating projections 86 are revolved, the actuating cylinder 80 rotates around the optical axis and the projection 106 eventually comes out of the recess 108 and moves sideward, as shown in FIG. 8. As a result, the projection 106 abuts against the end face 28a of the intermediate cylinder 28 and forces the intermediate cylinder 28 forward (leftward) against the force from the first compression coil spring 44. As the intermediate cylinder 28 is forced forward, the ocular lens cylinder 26 moves together with it to reach a minus diopter position beyond the zero diopter position, as shown in FIG. 8.

As the ocular lens cylinder 26 is forced to move to a minus diopter position, the slant surface 102a of the cam bore 102 comes into contact with the roller ring 104 of the actuating pin 100. Accordingly, as the attachment 200 is further turned and the actuating cylinder 80 is thereby further rotated, the actuating pin 100 is moved to a position where it is pressed against the flat surface 102b of the cam bore 102. In this way, the ocular lens group 24 is moved to the zero diopter position defined as the projection position. If the attachment 200 is removed, all the states are returned to those before the attaching of the attachment 200.

Thus, the projection 106 provided on the actuating cylinder 80, the recess 108 formed in the intermediate cylinder 28 and other associated elements comprise in combination a pre-moving means for previously moving the ocular lens group 24 disposed at the zero or plus diopter position to a minus diopter position. Accordingly, the mechanism is simple and yet enables a reliable operation.

As has been described above, the present invention enables the ocular lens group 24 to be moved to the zero diopter position defined as the projection position in response to the attaching of the attachment 200 to the attachment retaining ring 22, no matter where the ocular lens group 24 has been disposed within the dioptric adjustment range, by virtue of the arrangement that the actuating pin 100 is brought into contact with the flat surface 102b of the cam bore 102 through the roller ring 104 at any time when the attachment 200 is attached to the attachment retaining ring 22.

It should be noted that, although in FIG. 1 shows only one of each of the following members, that is, the interlocking pin 30, the pin 88, the fixed pin 94 and the actuating pin 100, these members are provided in pairs in such a manner that each pair of members are symmetrically disposed with each other about the center of their mutual supporting member.

According to the present invention, the ocular lens group can be moved to a predetermined projection position that is halfway in the dioptric adjustment range by the same moving means for projection at any time when the attachment of a photographic recording device or an imaging device is attached to the eyepiece, no matter where the ocular lens group has been disposed within the dioptric adjustment range. Accordingly, the ocular lens group can be set to exactly the same projection position regardless of whether it is moved from a position which is forward of the projection position or from a position which is rearward of it and there is therefore no fear of failure, for example, of mis-focusing. Thus, it is possible to project a clear image at all times.

While the invention has been described by reference to a specific embodiment chosen for purposes of illustration, it should be apparent that numerous modifications could be made thereto by those skilled in the art without departing from the basic concept and scope of the invention.

I claim:

1. An eyepiece mechanism for an endoscope, comprising:

an ocular lens that faces an emergent end face of an image guide fiber bundle;

means for adjusting a diopter level by causing said ocular lens to move back and forth within a range along an optical axis;

means for moving said ocular lens, said moving means being activated in response to the attaching of an attachment for an imaging device to said eyepiece mechanism so as to move said ocular lens linearly to a predetermined projection position halfway in the range of movement caused by said diopter level adjustment means from either a first position which is forward of said projection position or a second position which is rearward of said projection position; and means for previously moving said ocular lens when disposed at said second position to said first position, in response to the attaching of said attachment to said eyepiece mechanism to enable said ocular lens to be moved from said first position to said projection position.

2. An eyepiece mechanism for an endoscope, according to claim 1, wherein said projection position is a zero diopter position in the range of movement caused by said diopter level adjustment means, while said first position is a minus diopter position.

3. An eyepiece mechanism for an endoscope, according to claim 1, wherein said moving means has a pin which is movable only in a direction of said optical axis together with said ocular lens, and a cam which controls the position of said pin by rotating around said optical axis.

4. An eyepiece mechanism for an endoscope, according to claim 3, wherein an actuating cylinder rotates around said optical axis, said cam being provided in a side wall of said actuating cylinder.

5. An eyepiece mechanism for an endoscope, according to claim 4, wherein said actuating cylinder rotates around said optical axis in response to the attaching of an attachment for an imaging device to said eyepiece mechanism.

6. An eyepiece mechanism for an endoscope, according to claim 5, wherein a cylindrical member moves along said optical axis, but does not rotate around said optical axis, one of said cylindrical member and said actuating cylinder being provided with a projection while the other of said cylindrical member and said actuating cylinder is provided with a recess which faces said projection and which is sufficiently large to receive said projection, said projection and said recess comprising said previously moving means.

7. An eyepiece mechanism for an endoscope, according to claim 6, wherein, when said ocular lens is at said first position, said projection and said recess do not come into contact with each other even when said actuating cylinder is rotated.

8. An eyepiece mechanism for an endoscope, according to claim 6, wherein, when said ocular lens is at said second position, said projection extends into said recess, so that, when the attachment for an imaging device is attached to said eyepiece mechanism in this position, said projection comes out of said recess while activating said cylindrical member to move along said optical axis, causing said ocular lens to move from said second position to said first position.

9. A method for changing the diopter of an endoscope having an ocular lens which is adjacent to an end face of an image guide fiber bundle associated with said endoscope, said method comprising the steps of:

(a) connecting an attachment for an imaging device to an eyepiece of said endoscope;

(b) positioning said ocular lens at a first position in response to the connecting of said attachment device to said eyepiece if said ocular lens is in a second position, said first position being located either forwardly or rearwardly of a predetermined projection position;

(c) moving said ocular lens to said predetermined projection position from said first position, said predetermined projection position being located approximately halfway between said first position and said second position, in response to the attachment of said attachment device to said eyepiece.

10. An eyepiece mechanism for an endoscope comprising:

an ocular lens that faces an emergent end face of an image guide fiber bundle;

means for adjusting a diopter level by causing said ocular lens to move back and forth within a range along an optical axis;

means for moving said ocular lens, said moving means being activated in the response to the attaching of an attachment for an imaging device to said eyepiece mechanism so as to move said ocular lens to a predetermined projection position halfway in the range of movement caused by said diopter level adjustment means from either a first position which is forward of said projection position or a second position which is rearward of said projection position;

means for previously moving said ocular lens when disposed at said second position to said first position, in response to the attaching of said attachment to said eyepiece mechanism to enable said ocular lens to be moved from said first position to said projection position; and said means for previously moving comprising a cylindrical member which is moved by said diopter level adjustment means, wherein said ocular lens disposed at said second position is moved to said first position by said cylindrical member in response to the attaching of said attachment to said eyepiece mechanism.

11. An eyepiece mechanism for an endoscope according to claim 10, further including means for biasing said ocular lens against said cylindrical member wherein said biasing means defines a fixed relation between said cylindrical member and said ocular lens.

12. An eyepiece mechanism for an endoscope according to claim 10, wherein said means for moving said ocular lens comprises a cam follower mounted in a fixed position with respect to said ocular lens, and cam means for controlling the axial position of said cam follower, said cam means mounted for rotation about the optical axis of said ocular lens.

13. An eyepiece mechanism for an endoscope according to claim 11, wherein said means for moving said ocular lens comprises a cam follower mounted in a fixed position with respect to said ocular lens, and cam means for controlling the axial position of said cam follower, said cam means mounted for rotation about the optical axis of said ocular lens.

14. An eyepiece mechanism for an endoscope according to claim 12, wherein said cam follower in a pin.

15. An eyepiece mechanism for an endoscope according to claim 14, further comprising an actuating cylinder that rotates around said optical axis, said cam means being provided in a side wall of said actuating cylinder.

16. An eyepiece mechanism for an endoscope according to claim 15, wherein said actuating cylinder rotates around said optical axis in response to the attaching of an attachment for an imaging device to said eyepiece mechanism.

* * * * *

UNITED STATES PATENT AND TRADEMARK OFFICE
CERTIFICATE OF CORRECTION

PATENT NO. : 5,078,503
DATED : January 7, 1992
INVENTOR(S) : H. UEDA

It is certified that error appears in the above-indentified patent and that said Letters Patent is hereby corrected as shown below:

At column 10, line 28 (claim 14, line 2), change "in" to ---is---.

Signed and Sealed this

Ninth Day of August, 1994

Attest:

BRUCE LEHMAN

Attesting Officer        Commissioner of Patents and Trademarks